(No Model.) 2 Sheets—Sheet 2.
C. F. RUSET, Dec'd.
P. L. MILES, Administrator.
DYNAMO ELECTRIC MACHINE.
No. 322,310. Patented July 14, 1885.
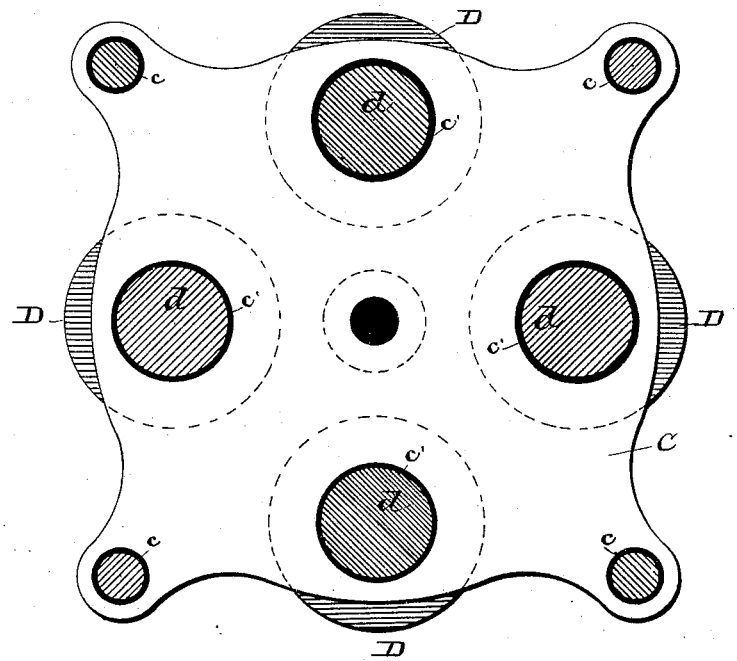
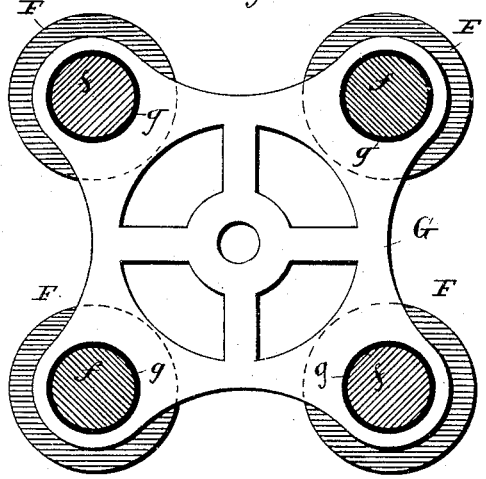
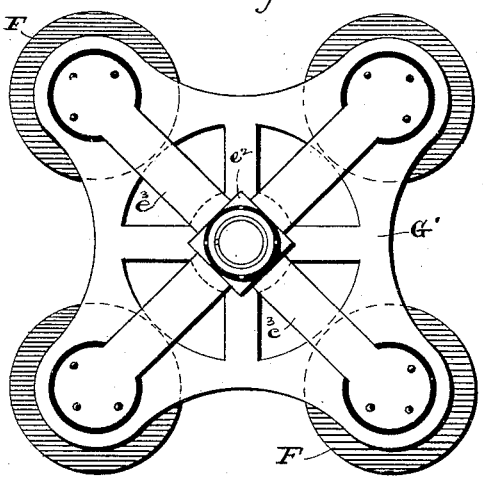

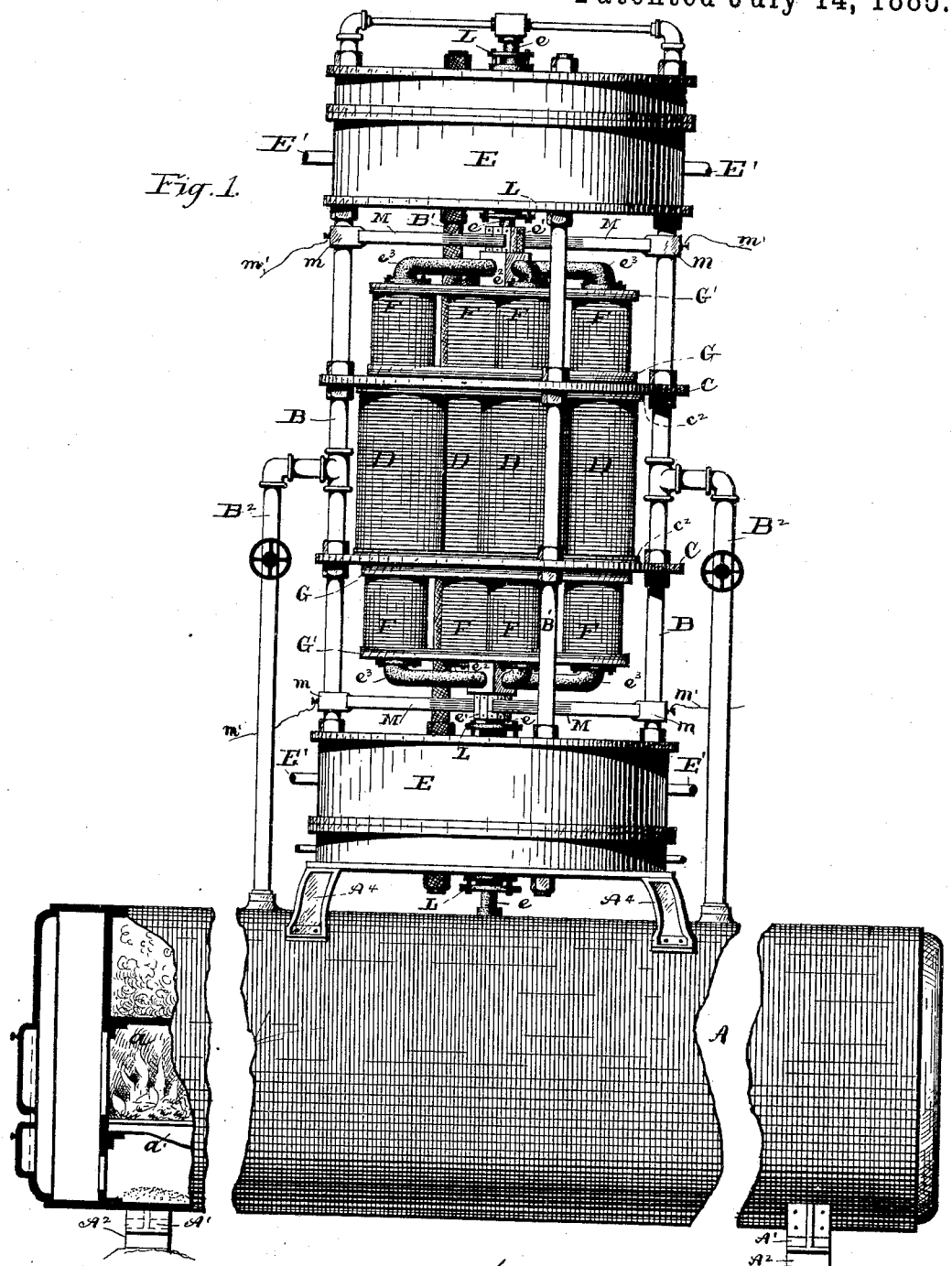

United States Patent Office.

PETER L. MILES, OF CLEVELAND, OHIO, (ADMINISTRATOR OF CHARLES F. RUSET, DECEASED,) ASSIGNOR TO MARTIN KEIPER, HENRY J. MYERS, WILLIAM F. BUCHHOLZ, JACOB KAHN, SIMON R. THORMAN, AND THE ESTATE OF CHARLES F. RUSET, DECEASED, ALL OF SAME PLACE.

DYNAMO-ELECTRIC MACHINE.

SPECIFICATION forming part of Letters Patent No. 322,310, dated July 14, 1885.

Application filed March 11, 1885. (No model.)

*To all whom it may concern:*

Be it known that CHARLES F. RUSET, deceased, formerly of Cleveland, in the county of Cuyahoga and State of Ohio, did invent certain new and useful Improvements in Electrical Machines; and I do hereby declare the following to be a full, clear, and exact description of the invention, such as will enable others skilled in the art to which it pertains to make and use the same.

The invention relates to improvements in electrical machines; and it consists in certain features of construction and in combination of parts hereinafter described, and pointed out in the claims.

In the accompanying drawings, Figure 1 is a side view in elevation of an apparatus embodying the invention. Fig. 2 is a plan view of the supporting parts for the field-magnets. Figs. 3 and 4 are plan views of the respective end plates forming the armatures.

A represents a steam-generator, with a fire-box, $a$, inside and grate-bars $a'$, with doors, dampers, and ash-pit arranged in the usual manner of this class of boilers. The boiler is mounted on legs $A'$, and these in turn rest on glass plates $A^2$ or other suitable insulating material, the insulation of the boiler being the object of this part of the device, and may be attained in any suitable manner with or without the legs. Legs $A^4$ are secured on top of the boiler, that support the balance of the apparatus. A supporting-frame is formed of the tubes B and B' and the plates C. The plates C have holes $c$, that register with each other in their respective plates, and through which the said tubes pass, the tubes being provided on either side of the respective plates with jam-nuts, as shown in Fig. 1. Between the plates C, but insulated therefrom by the rubber plates $c^2$, are the field-magnets D, two or more in number. Openings $c'$ through the plates C allow the cores $d$ of these magnets to pass through these plates without contact, so that the ends of these cores are flush with the outside of these plates, or may extend a trifle beyond. The magnets are of the usual construction; but as these magnets receive the electric current from two armatures the wire is correspondingly large as compared with the wire of the armatures.

E are rotary steam-engines, of ordinary construction, that receive steam through the tubes B, these tubes being connected in the center with the tubes $B^2$, that lead to the steam-space in the boiler.

E' are the exhaust-pipes for the engines. These engines have vertical spindles $e$, terminating below in conoidal points that are supported in the usual manner by suitable stepping, (not shown,) the object of such construction being to reduce the friction to a minimum and to support the spindles, so that they will bear equally on the sides of the stuffing-boxes where the spindles pass out of the engine-casing.

To the engine shafts or spindles $e$ are attached, respectively, the commutators $e'$ and the hubs $e^2$, with the arms $e^3$, that support the armatures.

The armatures consist of two or more spools, F, usually an even number, secured between the plates G and G', (see Figs. 3 and 4,) the latter plates having orifices $g$, through which the cores $f$ of the spools F protrude, and the arrangement of parts is such that the ends of these cores $f$ as the armature is revolved sweep over the ends of the cores $d$ and about as close to the latter as may be without colliding. The spools F are wound with insulated wire, connected with the commutators $e'$ in the usual manner. The two engines are arranged to run in opposite directions.

Brushes M operate on the commutators in the usual manner, and have binding-posts $m$, to which are attached the wires $m'$, all of the ordinary construction.

What is claimed is—

1. In a dynamo-electrical machine, armatures arranged on vertical spindles, and respectively on opposite sides of the field-magnets, rotary engines connected respectively with said spindles and arranged to revolve the armatures in opposite directions, substantially as set forth.

2. The combination with two sets of armatures arranged on vertical spindles, of field-magnets located between said series, rotary engines connected directly with the armature-spindles, and steps located outside of or beyond the outer ends of the armature spindles.

In testimony whereof I sign this specification, in the presence of two witnesses, this 9th day of March, 1885.

PETER L. MILES,
*Administrator of the Estate of Charles F. Russet, deceased.*

Witnesses:
 JOHN C. HARVEY,
 FREDK. KINSMAN.